United States Patent
Goodjohn et al.

(10) Patent No.: US 11,391,492 B2
(45) Date of Patent: Jul. 19, 2022

(54) DRY TANK DETECTION METHOD FOR A WATER HEATER APPLIANCE

(71) Applicant: Haier US Appliance Solutions, Inc., Wilmington, DE (US)

(72) Inventors: Paul Goodjohn, Crestwood, KY (US); Craig Iung-Pei Tsai, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 291 days.

(21) Appl. No.: 16/676,957

(22) Filed: Nov. 7, 2019

(65) Prior Publication Data
US 2021/0140680 A1    May 13, 2021

(51) Int. Cl.
*F24H 9/20* (2022.01)
*G01F 23/24* (2006.01)

(52) U.S. Cl.
CPC ........... *F24H 9/2021* (2013.01); *G01F 23/24* (2013.01)

(58) Field of Classification Search
CPC ...... G01F 15/005; G01F 15/003; G01F 23/24; G01F 23/247; G01F 23/0076; F24G 9/2021
See application file for complete search history.

(56) References Cited

U.S. PATENT DOCUMENTS

| | | | |
|---|---|---|---|
| 4,482,891 A * | 11/1984 | Spencer | G01F 23/24 340/620 |
| 5,838,241 A * | 11/1998 | Lease | G01F 23/268 340/618 |
| 6,649,881 B2 | 11/2003 | Scott et al. | |
| 7,706,670 B2 | 4/2010 | Knoeppel et al. | |
| 9,372,012 B2 | 6/2016 | Farris | |
| 9,377,342 B2 | 6/2016 | Chaudhry | |
| 2014/0037274 A1* | 2/2014 | Chaudhry | G01F 23/24 392/451 |
| 2020/0088561 A1* | 3/2020 | Hidaka | H01L 21/31 |

\* cited by examiner

*Primary Examiner* — Steven S Anderson, II
(74) *Attorney, Agent, or Firm* — Dority & Manning, P.A.

(57) ABSTRACT

A method for controlling a water heater appliance includes energizing the heating element for an energization period, such as less than two seconds. During the energization period, the appliance controller measures the electrical current passing through the heating element. The measured electrical current and a base signal are passed through a correlation filter to determine a correlation value. The base signal may correspond to the electrical current passing through the heating element when the tank is full or when the tank is empty, and the correlation value may be used to determine to which base signal the measured electrical current more closely correlates. In this manner, the correlation value is used to determine whether the heating element is submerged in water.

20 Claims, 4 Drawing Sheets

DRY TANK DETECTION METHOD FOR A WATER HEATER APPLIANCE

FIELD OF THE INVENTION

The present subject matter relates generally to water heater appliances and methods for operating water heater appliances to reduce the likelihood of damage to the heating elements.

BACKGROUND OF THE INVENTION

Certain water heater appliances include a tank therein. Heating elements, such as gas burners, electric resistance elements, or induction elements, heat water within the tank during operation of such water heater appliances. During operation, relatively cold water flows into the tank, and the heating elements operate to heat such water to a predetermined temperature. In particular, the heating elements generally heat water within the tank to a very high temperature. A mixing valve mixes the relatively hot water with relatively cold water in order to bring the temperature of such water down to suitable and/or more usable temperatures. For example, mixing valves may adjust the ratio of hot and cold water to supply heated water at an output temperature suitable for showering, washing hands, etc.

When a water heater is first installed or goes unused for a long period of time, it is important to ensure that it is full of water before heating, since the heating elements may be destroyed if they are energized for a prolonged period without being immersed in water. Existing solutions for detecting water levels include complex and costly sensor arrangements. For example, it is possible to incorporate a sensor to measure conductivity (and thus water presence), but this requires penetrating the tank, thus introducing the potential for leaks as well as added costs. Other conventional methods for detecting water levels do not have a quick enough response time to prevent damage to the heating elements and/or are prone to error.

Accordingly, a water heater appliance with features for ensuring the heating elements are submerged during operation would be useful. More specifically, a method of detecting water levels in a water heater tank and stopping the operation of the heating element when it is not submerged would be particularly beneficial.

BRIEF DESCRIPTION OF THE INVENTION

Advantages of the invention will be set forth in part in the following description, or may be apparent from the description, or may be learned through practice of the invention.

In accordance with one exemplary embodiment of the present disclosure, a water heater appliance is provided including a tank defining a chamber for holding water, a heating element for heating the water within the chamber, and a controller operably coupled to the heating element. The controller is configured for energizing the heating element for an energization period, measuring electrical current passing through the heating element during the energization period, determining a correlation value using the measured electrical current and a correlation filter, and determining that the heating element is submerged based on the correlation value.

In accordance with another exemplary embodiment of the present disclosure, a method for controlling a water heater appliance is provided. The water heater appliance includes a tank defining a chamber for holding water and a heating element for heating the water within the chamber. The method includes energizing the heating element for an energization period, measuring electrical current passing through the heating element during the energization period, determining a correlation value using the measured electrical current and a correlation filter, and determining that the heating element is submerged based on the correlation value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
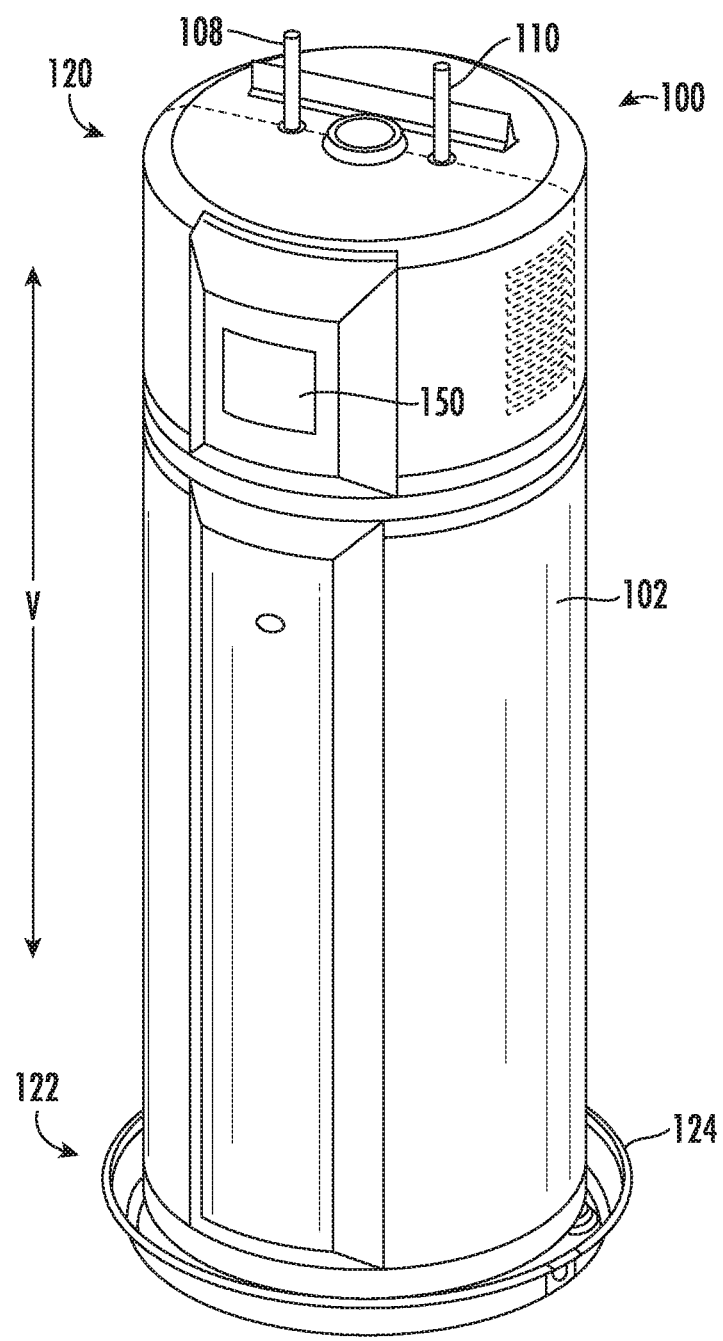
FIG. 1 provides a perspective view of a water heater appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a water heater appliance 100 according to an exemplary embodiment of the present subject matter. Water heater appliance 100 includes a casing 102. A tank 104 (FIG. 2) and heating elements 106 (FIG. 2) are positioned within casing 102 for heating water therein. Heating elements 106 may include a gas burner, a heat pump, an electric resistance element, a microwave element, an induction element, a sealed heat pump system or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Figure 2:
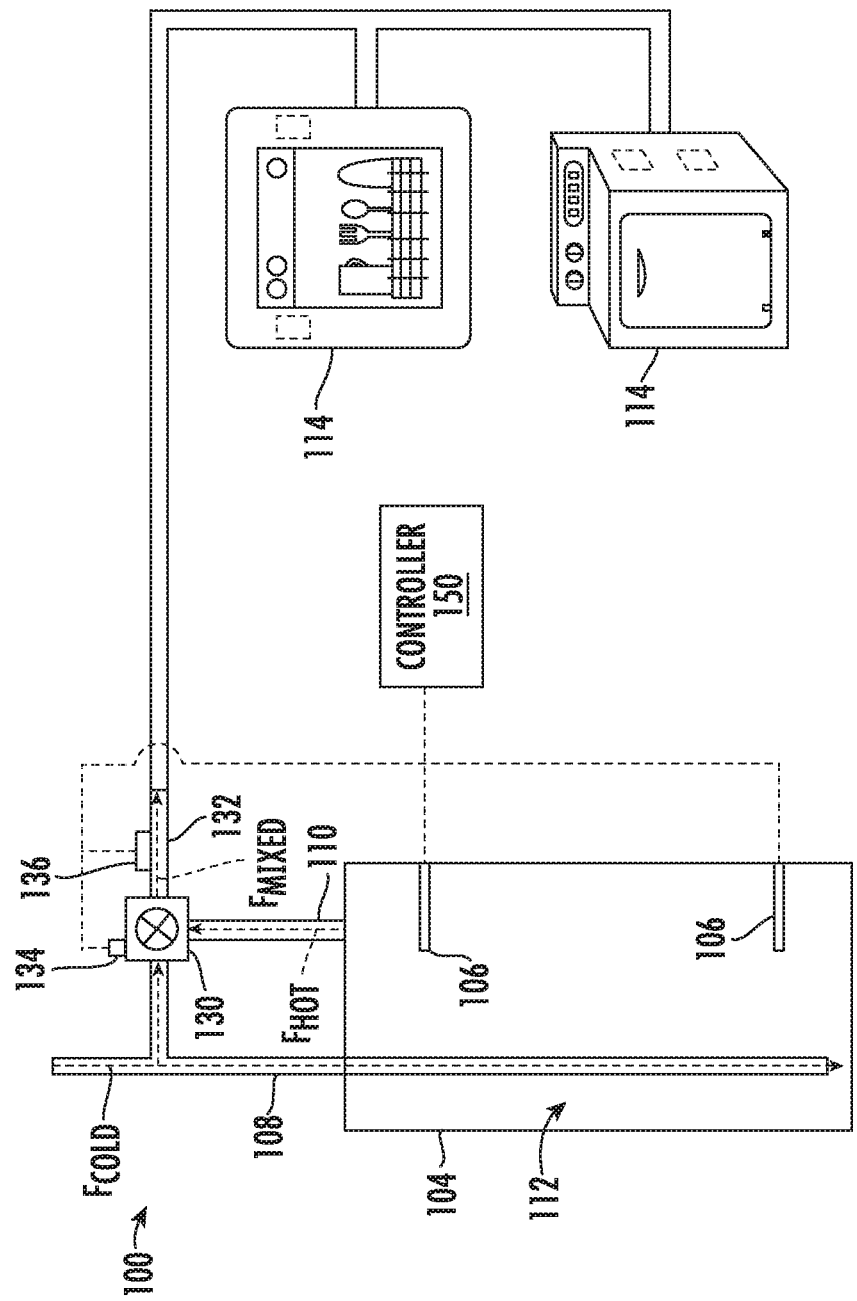
FIG. 2 provides a schematic view of certain components of a water heater system including the exemplary water heater appliance of FIG. 1 according to an exemplary embodiment of the present subject matter.

Water heater appliance 100 also includes a cold water conduit 108 and a hot water conduit 110 that are both in fluid communication with a chamber 112 (FIG. 2) defined by tank 104. As an example, cold water from a water source, e.g., a municipal water supply or a well, can enter water heater appliance 100 through cold water conduit 108 (shown schematically with arrow labeled $F_{cold}$ in FIG. 2). From cold water conduit 108, such cold water can enter chamber 112 of tank 104 wherein it is heated with heating elements 106 to generate heated water. Such heated water can exit water heater appliance 100 at hot water conduit 110 and, e.g., be supplied to a water consuming device 114 (FIG. 2). In this regard, water consuming devices 114 may include any suitable plumbing fixture, household appliance, or any other suitable device configured to draw water from water heater appliance 100, such as a bath, shower, sink, or any other suitable fixture.

Water heater appliance 100 extends longitudinally between a top portion 120 and a bottom portion 122 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. A drain pan 124 is positioned at bottom portion 122 of water heater appliance 100 such that water heater appliance 100 sits on drain pan 124. Drain pan 124 sits beneath water heater appliance 100 along the vertical direction V, e.g., to collect water that leaks from water heater appliance 100. It should be understood that water heater appliance 100 is provided by way of example only and that the present subject matter may be used with any suitable water heater appliance.

FIG. 2 provides a schematic view of certain components of water heater appliance 100. As may be seen in FIG. 2, water heater appliance 100 includes a mixing valve 130 and a mixed water conduit 132. Mixing valve 130 is in fluid communication with cold water conduit 108, hot water conduit 110, and mixed water conduit 132. As discussed in greater detail below, mixing valve 130 is configured for selectively directing water from cold water conduit 108 and hot water conduit 110 into mixed water conduit 132 in order to regulate an output temperature of water within mixed water conduit 132.

As an example, mixing valve 130 can selectively adjust between a first position and a second position. In the first position, mixing valve 130 can permit a first flow rate of relatively cool water from cold water conduit 108 (shown schematically with arrow labeled $F_{cold}$ in FIG. 2) into mixed water conduit 132 and mixing valve 130 can also permit a first flow rate of relatively hot water from hot water conduit 110 (shown schematically with arrow labeled $F_{hot}$ in FIG. 2) into mixed water conduit 132. In such a manner, water within mixed water conduit 132 (shown schematically with arrow labeled $F_{mixed}$ in FIG. 2) can have a first particular temperature when mixing valve 130 is in the first position.

Similarly, mixing valve 130 can permit a second flow rate of relatively cool water from cold water conduit 108 into mixed water conduit 132 and mixing valve 130 can also permit a second flow rate of relatively hot water from hot water conduit 110 into mixed water conduit 132 in the second position. The first and second flow rates of the relatively cool water and relatively hot water are different such that water within mixed water conduit 132 can have a second particular temperature when mixing valve 130 is in the second position. In such a manner, mixing valve 130 can regulate the temperature of water within mixed water conduit 132 and adjust the temperature of water within mixed water conduit 132 between the first and second particular temperatures.

It should be understood that, in certain exemplary embodiments, mixing valve 130 is adjustable between more positions than the first and second positions. In particular, mixing valve 130 may be adjustable between any suitable number of positions in alternative exemplary embodiments. For example, mixing valve 130 may be infinitely adjustable in order to permit fine-tuning of the temperature of water within mixed water conduit 132. Mixing valve 130 may be an electronic mixing valve. In addition, mixing valve 130 may be positioned within casing 102, e.g., above tank 104. Thus, mixing valve 130 may be integrated within water heater appliance 100. According to still other exemplary embodiments, mixing valve 130 may be positioned remote from water heater appliance 100, e.g., proximate a water consuming device.

Water heater appliance 100 also includes a position sensor 134. Position sensor 134 is configured for determining a position of mixing valve 130. Position sensor 134 can monitor the position of mixing valve 130 in order to assist with regulating the temperature of water within mixed water conduit 132. For example, position sensor 134 can determine when mixing valve 130 is in the first position or the second position in order to ensure that mixing valve 130 is properly or suitably positioned depending upon the temperature of water within mixed water conduit 132 desired or selected. Thus, position sensor 134 can provide feedback regarding the status or position of mixing valve 130.

According to the illustrated exemplary embodiment, water heater appliance 100 includes a mixed water conduit flow detector or temperature sensor 136 for detecting a temperature of mixed water passing through mixed water conduit 132. According to alternative embodiments, water heater appliance may further include a cold water conduit flow detector or temperature sensor, a hot water conduit flow detector or temperature sensor, or any other suitable sensors for detecting the flow and/or temperature of water within water heater appliance 100.

Water heater appliance 100 further includes a controller 150 that is configured for regulating operation of water heater appliance 100. Controller 150 is in, e.g., operative communication with heating elements 106, mixing valve 130, position sensor 134, and temperature sensor 136. Thus, controller 150 can selectively activate heating elements 106 in order to heat water within chamber 112 of tank 104. Similarly, controller 150 can selectively operate mixing valve 130 in order to adjust a position of mixing valve 130 and regulate a temperature of water within mixed water conduit 132.

Controller 150 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 150 can be positioned at a variety of locations. In the exemplary embodiment shown in FIG. 1, controller 150 is positioned within water heater appliance 100, e.g., as an integral component of water heater appliance 100. In alternative exemplary embodiments, controller 150 may positioned away from water heater appliance 100 and communicate with water heater appliance 100 over a wireless connection or any other suitable connection, such as a wired connection.

Controller 150 can operate heating elements 106 to heat water within chamber 112 of tank 104. As an example, a user can select or establish a set-point temperature for water within chamber 112 of tank 104, or the set-point temperature for water within chamber 112 of tank 104 may be a default value. Based upon the set-point temperature for water within chamber 112 of tank 104, controller 150 can selectively activate heating elements 106 in order to heat water within chamber 112 of tank 104 to the set-point temperature for water within chamber 112 of tank 104. The set-point temperature for water within chamber 112 of tank 104 can be any suitable temperature. For example, the set-point temperature for water within chamber 112 of tank 104 may be between about one hundred and forty degrees Fahrenheit and about one hundred and eighty-degrees Fahrenheit.

Controller 150 can also operate mixing valve 130 to regulate the temperature of water within mixed water conduit 132. For example, controller 150 can adjust the position of mixing valve 130 in order to regulate the temperature of water within mixed water conduit 132. As an example, a user can select or establish a predetermined target temperature of mixing valve 130, or the target temperature of mixing valve 130 may be a default value. The target temperature of mixing valve 130 can be any suitable temperature. For example, the target temperature of mixing valve 130 may be between about one hundred degrees Fahrenheit and about one hundred and twenty degrees Fahrenheit. In particular, the target temperature of mixing valve 130 may be selected such that the target temperature of mixing valve 130 is less than the set-point temperature for water within chamber 112 of tank 104.

Based upon the target temperature of mixing valve 130, controller 150 can adjust the position of mixing valve 130 in order to change or tweak a ratio of relatively cool water flowing into mixed water conduit 132 from cold water conduit 108 and relatively hot water flowing into mixed water conduit 132 from hot water conduit 110. More specifically, controller 150 can implement any suitable control strategy or algorithm to regulate the temperature of water within mixed water conduit 132. In such a manner, mixing valve 130 can utilize water from cold water conduit 108 and hot water conduit 110 to regulate the temperature of water within mixed water conduit 132.

Now that the construction of water heater appliance 100 and the configuration of controller 150 according to exemplary embodiments have been presented, an exemplary method 200 of operating a water heater appliance will be described. Although the discussion below refers to the exemplary method 200 of operating water heater appliance 100, one skilled in the art will appreciate that the exemplary method 200 is applicable to the operation of a variety of other water heater appliances. In exemplary embodiments, the various method steps as disclosed herein may be performed by controller 150 or a separate, dedicated controller.

Figure 3:
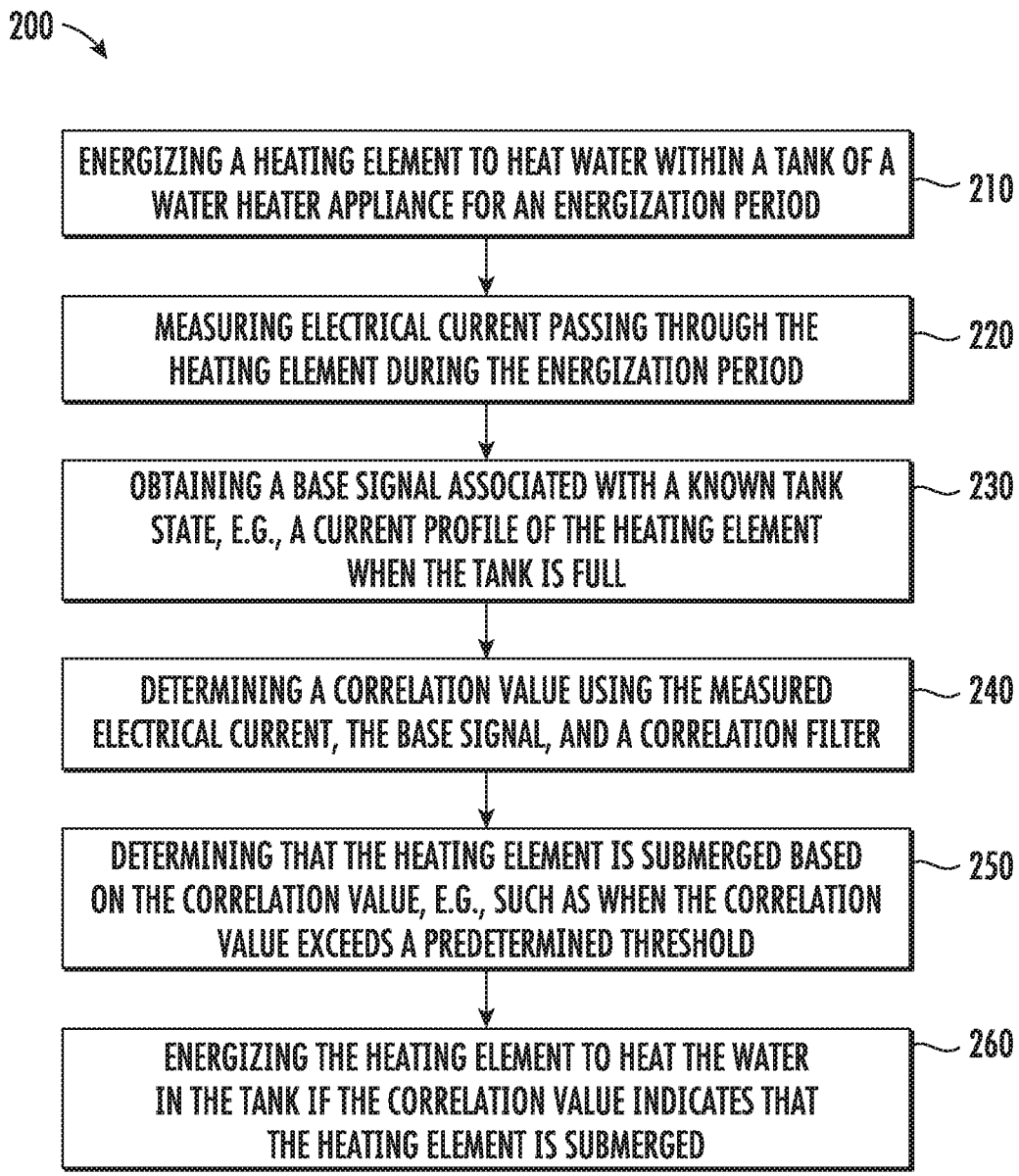
FIG. 3 illustrates a method for controlling a water heater appliance according to an exemplary embodiment of the present subject matter.

Referring now to FIG. 3, method 200 includes, at step 210, energizing a heating element to heat water within a tank of water heater appliance for an energization period. In this regard, continuing the example from above, controller 150 may operate heating elements 106 to heat water within chamber 112. Notably, as explained above, if for some reason there is no water within chamber 112 or an insufficient amount of water within chamber 112, heating element 106 may quickly overheat and fail. Therefore, it may be desirable to perform a water level check to determine whether heating elements 106 are sufficiently submerged or immersed in water to prevent such damage.

According to exemplary embodiments, the energization period is selected to be long enough to obtain useful data regarding the water level without exposing heating elements 106 to dangerous operating conditions. For example, the energization period may be between about 1 and 10 seconds, between about 1.5 and 5 seconds, between about 2 and 4 seconds, or about 3 seconds. It should be appreciated, that as used herein, terms of approximation, such as "approximately," "substantially," or "about," refer to being within a ten percent margin of error. It should further be appreciated that the energization period may vary according to alternative embodiments, e.g., depending on the type or number of heating elements used, the configuration of the water heater appliance, etc.

Step 220 includes measuring electrical current passing through the heating element during the energization period. In this regard, for example, controller 150 may continuously monitor or periodically sample the electrical current passing through heating element 106. As explained in detail below, this measured electrical current may be used to determine water levels within tank 104 and whether heating elements 106 are experiencing dangerous operating conditions.

It should be appreciated that any suitable current sampling cycle may be used while remaining within the scope of the present subject matter. For example, heating element 106 may be energized for 2 seconds (i.e., the energization period) and current values may be measured periodically, e.g., about every one second, about every half second, about every 100 ms, about every 50 ms, about every 10 ms, or at an even higher sampling rate. In addition, several energization periods and measurement cycles may be performed in a short period of time, e.g., by energizing and de-energizing heating elements 106 repeatedly over several minutes.

Figure 4:
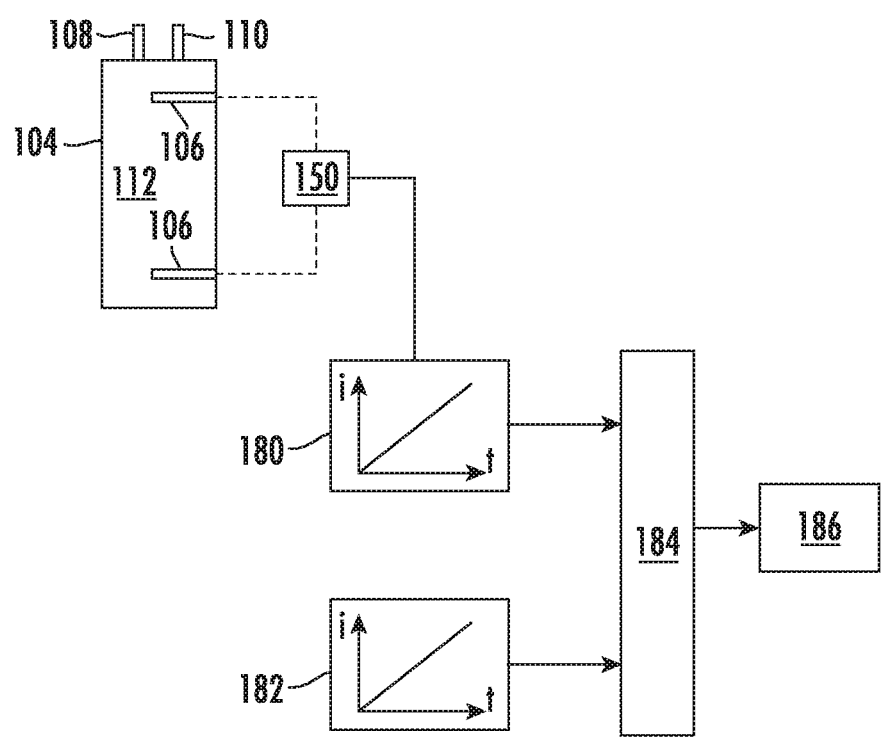
FIG. 4 provides a schematic representation of the use of a correlation filter to compare measured and known current values for a water heater heating element.

Method 200 further includes, at step 230, obtaining a base signal associated with a known tank state. For example, according to an exemplary embodiment, the base signal may be an electrical current profile generated by heating elements 106 when the tank is full. Step 240 includes determining a correlation value using the measured electrical current (e.g., from step 220), the base signal (e.g., from step 230), and a correlation filter. This process is illustrated schematically in FIG. 4, where the measured electrical current is identified by reference numeral 180, the base signal is identified by reference numeral 182, the correlation filter is identified by reference numeral 184, and the correlation value generated by the correlation filter is identified by reference numeral 186. As explained below, the correlation filter 184 may be an algorithm or program that receives the measured electrical current 180 and the base signal 182 to generate a correlation value 186 that is generally representative of how similar the measured electrical signal 180 is to the base signal 182.

As used herein, the term "correlation filter" and the like is generally intended to refer to a signal processing filter intended to correlate measured electrical current signals 180 to known current values 182 to determine whether heating element 106 is submerged, the level of water in the tank 104, the health of heating element 106, or other data useful for the operation of water heater appliance 100. The correlation filter 184 may a finite impulse response (FIR) filter, and may employ any other suitable digital signal processing techniques.

For example, current measurements 180 may be fed through a one-dimensional correlation FIR filter using current samples from a known tank state as filter coefficients. The amplitude response of this filter (e.g., correlation value 186) may be the degree of correlation between the measured state and the known state. Thus, for example, assuming the known tank state is a full tank, a correlation value 186 of 0.0 indicates that the measured state does not correlate at all with the full tank, thus indicating that the tank is empty and the heating element not submerged. By contrast, a correlation value 186 of 1.0 indicates complete correlation with the full tank state, thus indicating that the tank is full of water.

Thus, the correlation value 186 returned from the correlation filter 184 may be used by controller 150 to infer whether the heating element 106 is submerged or not, and such knowledge may be used to prevent operating the heating element 106 in dangerous conditions, such as when it is not submerged in water and prolonged operation would cause a burnout. Specifically, step 250 includes determining that the heating element is submerged based on the correlation value, e.g., such as when the correlation value exceeds a predetermined threshold. The predetermined threshold may be set by the user, by the manufacturer, by the heating element provider, or may be determined in any other suitable manner. According to an exemplary embodiment, the predetermined threshold may be greater than 0.5, greater than 0.6, greater than 0.7, greater than 0.8, greater than 0.9, or approximately 1.

According to an exemplary embodiment, correlation values may be extracted from the correlation filter for one or more current samples taken during a time period when the heating element is energized. In addition, in order to improve the accuracy of the correlation value generated by the correlation filter, several measurement cycles may be performed in a short period of time, e.g., by energizing in the energizing heating elements 106 repeatedly over several minutes. Other suitable sampling techniques may be used while remaining within the scope of the present subject matter.

Step 260 includes energizing the heating element to heat the water in the tank if the correlation value indicates that the heating element is submerged. In this regard, if the output of the correlation filter 184 indicates that heating element 106 is sufficiently submerged in water to prevent dangerous operation, controller 150 may energize heating element 106 to heat the water within tank 104. By contrast, if the correlation value 186 indicates that the heating element 106 is not submerged, controller 150 may prevent operation of heating element 106 until this condition is corrected. In addition, according to exemplary embodiments, controller 150 may be configured for regulating a valve, e.g., coupled to cold water conduit 108, to fill chamber 112 with water when the correlation value 186 indicates that the chamber 112 is empty. In addition, controller 150 may be configured for providing a user notification if the correlation value 186 indicates that the heating element 106 is not submerged.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using water heater appliance 100 as an example, it should be appreciated that these methods may be applied to the operation of any suitable water heater appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A water heater appliance comprising:
    a tank defining a chamber for holding water;
    a heating element for heating the water within the chamber; and
    a controller operably coupled to the heating element, the controller being configured for:
        energizing the heating element for an energization period;
        measuring electrical current passing through the heating element during the energization period;
        determining a correlation value using the measured electrical current and a correlation filter, wherein the correlation filter utilizes one or more digital signal processing techniques; and
        determining that the heating element is submerged based on the correlation value.

2. The water heater appliance of claim 1, wherein determining the correlation value using the measured electrical current and the correlation filter comprises:
    obtaining a base signal associated with a known tank state; and
    generating the correlation value using the correlation filter, the measured electrical current, and the base signal.

3. The water heater appliance of claim 1, wherein determining that the heating element is submerged comprises:
    determining that the correlation value generated using the correlation filter exceeds a predetermined threshold.

4. The water heater appliance of claim 3, wherein the predetermined threshold is greater than 0.8.

5. The water heater appliance of claim 1, wherein the correlation value is a value between 0.0 and 1.0.

6. The water heater appliance of claim 1, wherein the energization period is less than three seconds.

7. The water heater appliance of claim 1, wherein measuring electrical current passing through the heating element during the energization period comprises taking periodic measurements while the heating element is energized.

8. The water heater appliance of claim 7, wherein a sampling rate of periodic measurements is about one measurement per 50 milliseconds.

9. The water heater appliance of claim 1, wherein the controller is further configured for:
    energizing the heating element to heat the water in the tank if the correlation value indicates that the heating element is submerged.

10. The water heater appliance of claim 1, wherein the controller is further configured for:
    providing a user notification if the correlation value indicates that the heating element is not submerged.

11. The water heater appliance of claim 1, wherein the correlation filter comprises a finite impulse response filter.

12. A method for controlling a water heater appliance, the water heater appliance comprising a tank defining a chamber for holding water and a heating element for heating the water within the chamber, the method comprising:
   energizing the heating element for an energization period;
   measuring electrical current passing through the heating element during the energization period;
   determining a correlation value using the measured electrical current and a correlation filter, wherein the correlation filter utilizes one or more digital signal processing techniques; and
   determining that the heating element is submerged based on the correlation value.

13. The method of claim 12, wherein determining the correlation value using the measured electrical current and the correlation filter comprises:
   obtaining a base signal associated with a known tank state; and
   generating the correlation value using the correlation filter, the measured electrical current, and the base signal.

14. The method of claim 12, wherein determining that the heating element is submerged comprises:
   determining that the correlation value generated using the correlation filter exceeds a predetermined threshold.

15. The method of claim 14, wherein the predetermined threshold is greater than 0.8.

16. The method of claim 12, wherein the energization period is less than two seconds.

17. The method of claim 12, wherein measuring electrical current passing through the heating element during the energization period comprises taking periodic measurements while the heating element is energized.

18. The method of claim 12, further comprising:
   energizing the heating element to heat the water in the tank if the correlation value indicates that the heating element is submerged.

19. The method of claim 12, further comprising:
   providing a user notification if the correlation value indicates that the heating element is not submerged.

20. The method of claim 12, wherein the correlation filter comprises a finite impulse response filter.

* * * * *